United States Patent [19]
Matsumoto et al.

[11] Patent Number: 6,023,571
[45] Date of Patent: Feb. 8, 2000

[54] SYSTEM FOR FILTERING EVENTS OCCURRED WITHIN A PREDETERMINED PERIOD OF TIME

[75] Inventors: Kazunori Matsumoto; Kazuo Hashimoto, both of Saitama, Japan

[73] Assignee: Kokusai Denshin Denwa Co. Ltd., Tokyo, Japan

[21] Appl. No.: 09/019,198

[22] Filed: Feb. 5, 1998

[30] Foreign Application Priority Data

Feb. 6, 1997 [JP] Japan ............................. 9-036947

[51] Int. Cl.⁷ ..................... G06F 3/00; G01B 7/00
[52] U.S. Cl. ..................... 395/500.23; 395/500.27; 707/6; 707/7; 707/203; 707/907; 708/300; 708/149
[58] Field of Search ..................... 395/180, 181, 395/500.23, 500.27; 364/578, 468.1, 410.1, 148.04, 148.1, 149; 707/6, 7, 203, 205, 907; 708/300; 700/149

[56] References Cited

U.S. PATENT DOCUMENTS

| | | | |
|---|---|---|---|
| 5,263,123 | 11/1993 | Hayashi | 395/51 |
| 5,301,258 | 4/1994 | Hayashi | 395/52 |
| 5,309,448 | 5/1994 | Bouloutas et al. | 371/29.1 |
| 5,661,668 | 8/1997 | Yemini et al. | 364/550 |

OTHER PUBLICATIONS

"Automating Process Discovery Through Event–Data Analysis", Cook et al, Proceedings of the 17th Annual Conference on Software Engineering, Conf. 17, Apr. 23, 1995, pp. 73–82.

"Automated Acquisition of Knowledge for an Expert System for Process Control", Walburn et al, *IEE Proceedings E. Computers & Digital Techniques,* vol. 136, No. 6, Part E, Nov. 1, 1989, pp. 548–556.

*Primary Examiner*—Kevin J. Teska
*Assistant Examiner*—Thai Phan
*Attorney, Agent, or Firm*—Nikaido Marmelstein Murray & Oram LLP

[57] ABSTRACT

A system for filtering events which have occurred within a predetermined period of time includes a first generation unit for generating association rules between the events (parameters) which simultaneously occur within the predetermined period of time, a second generation unit for generating groups of events suited for the VAR model analysis based upon the association rules generated in the first generation unit, an analysis unit for analyzing groups of events generated in the second generation unit, the analysis of the event groups being executed by using the VAR model analysis, and a verifying unit for verifying reliability of the association rules generated in the first generation unit, the verification being executed by using the VAR model.

6 Claims, 1 Drawing Sheet

SYSTEM FOR FILTERING EVENTS OCCURRED WITHIN A PREDETERMINED PERIOD OF TIME

FIELD OF THE INVENTION

The present invention relates to a system for filtering events which occur within a predetermined period of time.

DESCRIPTION OF THE RELATED ART

There exists no system for filtering a large number of events in an event log database, which occur due to a single cause, with considering time sequential causality.

SUMMARY OF THE INVENTION

It is therefore an object of the present invention to provide a system for filtering events occurring within a predetermined period, whereby simultaneously generated mutual causalities with a large number of parameters can be effectively filtered.

According to the present invention, a system for filtering events occurring within a predetermined period of time is provided. The system includes a first generation unit for generating association rules between the events (parameters) which simultaneously occur within the predetermined period of time, a second generation unit for generating groups of events suited for the VAR (Vector Auto Regressive) model analysis based upon the association rules generated in the first generation unit, an analysis unit for analyzing the groups of events generated in the second generation unit, the analysis of the event groups being executed by using the VAR model analysis, and a filtering unit for verifying reliability of the association rules generated in the first generation unit, the verification being executed by using the VAR model.

Thus, any cross causalities of a large number of events (parameters), which causalities have not been predicted beforehand and simultaneously occurring can be effectively discovered.

It is preferred that the first generation unit includes a unit for generating association rules between the events based upon a basket analysis method using support considering Poisson error and confidence considering error.

It is also preferred that the second generation unit includes a unit for dividing the events into groups of events, each of the groups having the number of events equal to or less than a predetermined number.

Preferably, the analysis unit includes a unit for forcibly resetting coefficients used in the VAR model when there is no association rule between the events corresponding to the coefficient.

It is further preferred that the filtering unit includes a unit for verifying reliability of the association rules by using the STP analysis method.

Preferably, the filtering unit includes a unit for forcibly resetting coefficients used in the VAR model when there is no association rule between the events corresponding to the coefficient.

Further objects and advantages of the present invention will be apparent from the following description of the preferred embodiments of the invention as illustrated in the accompanying drawings.

DESCRIPTION OF THE PREFERRED EMBODIMENTS

Figure 1:
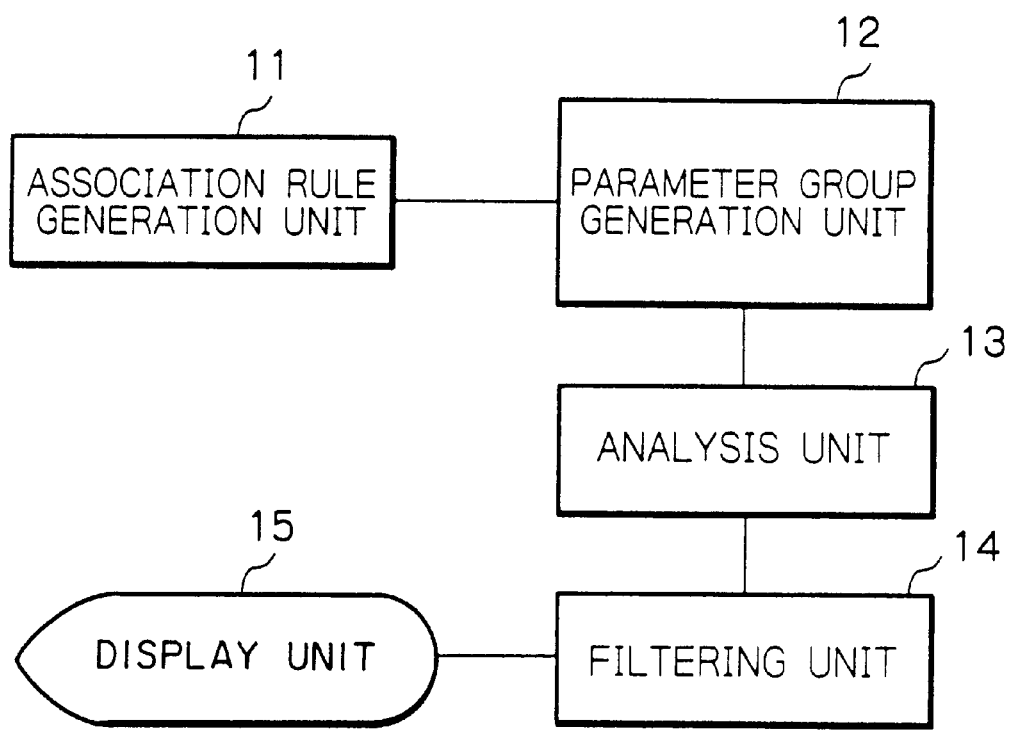
FIG. 1 is a block diagram schematically showing a constitution of an event filtering system according to the present invention.

In FIG. 1, reference numeral 11 denotes an association rule generation unit, 12 a parameter group generation unit, 13 an analysis unit, 14 a filtering unit, and 15 a display unit.

First, the operation of the association rule generation unit 11 is described in detail.

This generation unit 11 detects association rules of events simultaneously occurring within a predetermined period of time (window) to analyze mutual causality. More particularly, the unit 11 recognizes events occurring within a predetermined period of time before and after each sampling time as a transaction and analyzes it.

The unit 11 adopts a modified basket analysis method. The basic basket analysis method extracts only important relationships by defining confidence which depends upon the number of occurred transactions (sets of items), when relationships between items such as purchase of bread and purchase of milk are extracted as an association rule of purchase of bread→purchase of milk.

In the modified basket method, definition of itemset, definition of support in itemset, definition of confidence, production method of important itemset and production method of association rules are modified.

The itemset is defined with considering time sequence. Events occurred within a predetermined period of time $t2$ from a time point $t$ is considered as a transaction. Thus, the items are events $a_{t,2;i} = \{s_{t,i}: t=[t,t+t2], i=1, \ldots, L$, with value of 1$\}$ occurred within a time period $[t,t+t2]$. The itemset has to contain the event occurred at a reference time point $t$. For example, a transaction $x$ may be $x = <a_{0,1}, a_{1,5}, a_{2,6}, a_{2,15}>$ where $t2=0$ means occurrence at the reference time point.

$L$ transactions can be obtained by executing the above prosecutions for the all data at $L$ points with changing the reference time point $t$. A set of transactions is indicated by $D = \{x_j\}$ where $j=1, \ldots, L$.

The association rule is defined as follows. If partial sets $B$ and $H$ ($B \cap H = \{\phi\}$) are defined in the itemset $x$ of the transaction $x$, it can be considered that "H is satisfied when B is satisfied". This relationship is described as "an association rule : $B \rightarrow H$". $B$ is called as a body and $H$ is called as a head.

In the basic basket analysis method, although the support is defined by (the number of interested events)/(the number of all events), information with respect to the absolute occurrence number of these interested events is truncated. In the modified basket method, the support of the itemset is defined as follows on the assumption that the events are pursuant to Poisson process.

$$\text{support}(x) = (\text{average of support}) \pm (\text{its standard deviation})$$

$$= 100 \times \{(\text{the number of events in } x) \pm \sqrt{\text{the number of events in } x}\} / \{(\text{the number of all transactions}) \pm \sqrt{\text{the number of all transactions}}\}$$

If the number of events in x is expressed by $nx$, $\sqrt{\text{the number of events in x}}$ is expressed by $enx$, the number of all transactions is expressed by $L$, and $\sqrt{\text{the number of all transactions}}$ is expressed by $eL$, support (x) is expressed as $$\text{support}(x) = 100 \times (nx \pm enx)/(L \pm eL)$$

$$= 100 \times nx/L \pm 100 \times \sqrt{\frac{1}{L^2}enx^2 + \frac{nx^2}{L^4}eL^2}$$

This is based upon the fact that true average of Poisson distribution with a frequency m is m and that its standard deviation is $\sqrt{m}$.

Definition of confidence in an association rule is substantially the same as that of the basic method except that this system adopt confidence considering its error.

If support is expressed as $$\text{support}(x) = sx \pm esx, \quad \text{support}(x \wedge y) = sxy \pm esxy$$

$$\text{confidence}(x \rightarrow y) \text{ is expressed as}$$

$$\text{confidence}(x \rightarrow y) = \text{support}(x \wedge y)/\text{support}(x)$$

$$= sxy/sx \pm \sqrt{\frac{1}{sx^2}esxy^2 + \frac{sxy^2}{sx^4}esx^2}$$

In order to extract useful itemset, the minimum threshold value of confidence (minconf) and the minimum threshold value of certainty (mincert) which are references for adoption/rejection of the itemset are used.

Certainty of itemset Cert(x) is expressed as $$\text{Cert}(x) = 100 \times \sum_{m=\lambda-\sqrt{\lambda}}^{\lambda+\sqrt{\lambda}} P(m|\lambda)$$

$$= 100 \times e^{-\lambda} \sum_{m=\lambda-\sqrt{\lambda}}^{\lambda+\sqrt{\lambda}} \frac{\lambda^m}{m!} \quad (\%)$$

wherein $\lambda$ is the number of occurred itemsets x. The certainty represents cumulative density in the standard deviation ($\sqrt{\lambda}$) in Poisson distribution defined by the average $\lambda$. When the number of occurred events increases, this certainty increases and thus ambiguity is so decreased.

The itemsets and the association rules are evaluated as follows.

Itemsets with large uncertainty are rejected. The certainty of events based upon Poisson distribution is defined only by the number of its occurrence. Thus, the uncertainty of each itemset is evaluated in accordance with certainty so as to reject the itemset with a low certainty less than the mincert.

Association rules with a low confidence less than the minconf is also rejected.

Negative association rules are rejected. If confidence of the rule is lower than support of its head (H), this rule is rejected. If first index of change of confidence lift1(B→H)= confidence(B→H)/support(H)(including error) is lower than 1, then the rule is rejected. If confidence of the rule is lowered by adding a condition (D) to body (C), this rule is rejected. If second index of change of confidence lift2(C+D→H)=confidence(C+D→H)/confidence(C→H)(including error) is lower than 1, then the rule is rejected.

Association rule with lower importance item added to its body is also rejected. In order to evaluate independency between the head and the body, Akaike's Information Criteria (AIC) may be used.

Algorithm of the association rule generation unit 11 is as follows.

Step 0: set of important association rules: R={φ}
Step 1: set of important items: $I_1$={φ}
Step 2: q=1, . . . , N
  Step 3-1: $y_q$={$a_q$}, the number of occurrence (=n($y_q$)) is counted
  Step 3-2: itemset containing no item occurred at the reference time point ($a_{0,*}$) is rejected
Step 4: if Cert($y_q$)<mincert, then go to Step 2 (itemset with large uncertainty is rejected)
Step 5: $y_q$ is included into $I_1$, go to Step 2
Step 6: p=2, . . . , N
Step 7: p items set is generated by composition of sets in $I_{p-1}$: $Y_p$
  $Y_p$={$y_q$:q=1, . . . $M_p$}, $M_p$: the number of sets contained in the set $Y_p$
Step 8: set of important items: $I_p$={φ}
Step 9: q=1, . . . , $M_p$
  Step 10-1: $y_q$={$a_q$}, the number of occurrence (=n($y_q$)) is counted
  Step 10-2: itemset containing no item occurred at the reference time point ($a_{0,*}$) is rejected
Step 11: if Cert($y_q$)<mincert, then go to Step 9 (itemset with large uncertainty is rejected)
Step 12: flag=0
Step 13: r=1, . . . , (p−1)
Step 14: partial set of r items set $Y_q$: $Z_r$ $Z_r$={$z_s$:s=1, . . . , $O_r$}, $O_r$: the number of sets contained in the set $Z_r$
Step 15: s=1, . . . , $O_r$
  Step 16-1: association rule: B→H, body: B={$y_p$−$z_s$} and head: H=$z_s$ are defined
  Step 16-2: association rule B={$y_p$−$z_s$} containing no item occurred at the reference time point ($a_{0,*}$) is rejected, go to Step 15
Step 17: if confidence(B→H)<minconf, then go to Step 15 (association rule with low confidence is rejected)
Step 18: lift1(B→H)=confidence(B→H)/support(H) if lift1(B→H)<1 then go to Step 15 (negative association rule is rejected)
Step 19: if AIC(DM)>AIC(IM) then go to Step 15 (association rule with no dependency between head and body is rejected)
Step 20: t=1, . . . , (r−1)
Step 21: partial set of t items set B: $W_t$
  $W_t$={$w_u$:u=1, . . . , $P_t$}, $P_t$: the number of sets contained in the set $W_t$
Step 22: u=1, . . . , $P_t$
Step 23: C={B−$w_u$} and D=$w_u$ are defined
Step 24: if set of rules R contains no association rule of C→H, then go to Step 22
Step 25: lift2(C+D→H)=confidence(C+D→H)/ confidence(C→H)
  if lift2(C+D→H)<1 then go to Step 15 (negative association rule is rejected)
Step 26: if AIC(DM)>AIC(IM) then go to Step 15 (association rule with added lower importance item is rejected)
Step 27: go to Step 22
Step 28: go to Step 20
Step 29 association rule of B→H is included in the set of rules R, flag=1
Step 30 go to Step 15
Step 31: go to Step 13
Step 32: if flag=1, then itemset $y_q$ is included in the important itemset $I_p$ Step 33: go to Step 9
Step 34: go to Step 6

The operation of the parameter group generation unit 12 shown in FIG. 1 is now described in detail.

This generation unit 12 divides parameters (events) into groups, each including a predetermined or less number of parameters used for VAR (Vector or Multivariate Auto-Regressive model), in accordance with the association rules between the parameters (events), derived by the unit 11. This division is necessary because the VAR method has the upper limit of the number of parameters to be analyzed.

In the unit 12, the graphic separation method according to the graph theory is basically used. Basic matrix of cut set of the objected graph, which is used for a reference at the graphic separation is generated, and then groups of the parameters with the upper limit of the parameter number are generated by the division.

First, definitions with respect to graph are described.

graph: dots (vertexes) and edges connecting the dots vertex set: $V=\{v_1, \ldots, v_i, \ldots, v_I\}$ ($v_i$: each vertex, I: total number of vertexes in the graph)

edge: $e_j=\{v_p, v_q\}$ ($e_j$: line across $v_p$ and $v_q$)

edge set: $E=\{e1, \ldots, e_j, \ldots, e_J\}$ ($e_j$: each edge, J: total number of edges in the graph)

formal representation of the graph: G(V,E) (this graph consists of vertexes V and edges E)

tree: non-directed graph wherein all vertex pairs are just connected by one column of edges generation tree: tree including all vertexes in the graph chord if T represents the tree of the graph, edge which is not included in T is called as chord with respect to T closed loop: column of edges starting from a point and terminated to the same point without including the same edge twice cut set: edge set $E_1$ if this edge set is removed from the connected graph G(V,E), the graph becomes a non-connected graph.

Next, definitions of matrixes accompanying with the graph are described.

connection matrix (B) (matrix B is a connection matrix of graph G(V,E)): each row of B corresponds to vortex of G, each column of B corresponds to edge of G, $b_{ij}=1$ when j-th edge is connected with i-th vortex and $b_{ij}=0$ when otherwise, and all columns corresponding to loops are 0 closed loop matrix (C) (matrix C is a closed loop matrix of graph G(V,E)): each row of C corresponds to closed loop of G, each column of C corresponds to edge of G, and $c_{ij}=1$ when j-th edge is included in i-th closed loop and $c_{ij}=0$ when otherwise cut set matrix (K) (matrix K is a cut set matrix of graph G(V,E)) each row of K corresponds to cut set of G, each column of K corresponds to edge of G, and $k_{ij}=1$ when j-th edge is included in i-th cut set and $k_{ij}=0$ when otherwise.

The maximum number of parameters in each group finally obtained is defined as maximum parameter number (MP). Since the number of variants allowed for the VAR method is up to 5, it is desired to determine as MP=5 in general.

(1) In order to extract groups of the parameters, first, composite rules are transformed to simple rules. The composite rule is an association rule in which its head or its body is constituted by a plurality of parameters, for example [Tires]→[Automotive Services]. Whereas the simple rule is an association rule in which each of its head and body is constituted by a single parameter, for example [Tires] and [Auto Accessories]→[Automotive Services]. Since the VAR method cannot evaluate composite rule, it is necessary to transform such composite rule to simple rules if the association rule contains composite rule. This transformation is executed by searching composite association rule in which its head or its body is constituted by a plurality of parameters, and by generating all combinations of simple rules which are defined by the respective parameters in the body and by the respective parameters in the head. No generation of simple rule is necessary if this simple rule has been existed already. Support and confidence of the newly generated simple rules depend on those of the composite rule.

(2) Then, directed graphs are changed into non-directed graphs. The association rules are expressed as the directed graphs in which directions are defined for indicating relationships between parameters. Since such directional information is unnecessary to this end, graph is changed to non-directed graph. This change is executed by canceling directional information in the association rule (relationships between parameters are expressed as pairs of two parameters), by adopting one rule when there two bidirectional association rules between two parameters and adopting larger support and confidence, by translating the parameters into vortexes in the graph in accordance with the graph theory, and finally by expressing all relationships on the graphs by means of connection matrix.

(3) Next, connected graphs are extracted from all the graphs. Group of connected parameters is focussed from all parameters. This extraction is executed by checking all the edges and extracting groups of the connected vortexes to express the connected graphs constituted by the respective groups of the connected vortexes as $G_n$ (n=1, ..., N, N is the total number of the connected graphs), by generating a connection matrix $B_n$: n=1, ..., N for each of the connected graphs $G_n$, and by storing partial graphs contained in each graph $G_n$ and provided with the number of the vortexes equal to or less than MP into "a set of final partial graphs R".

(4) Then, basic matrix of cut sets is generated from the graphs. Namely, for each of the graphs $G_n$, its cut set $K_n$ is extracted. To this end, a generation tree is generated from the connection matrix of the graph, then a basic matrix of closed loops is generated, and finally the basic matrix of cut sets is generated.

(4-1) The generation tree (T) is obtained from the connection matrix (B) as follows. The number of the vortexes is indicated as I.

Step 1: edge set T to be included in the generation tree is determined. Initially, T=0. Labels of "0" are attached to all the edges.

Step 2 edge $e_1$ is included in T. Both vortexes connected to $e_1$ are checked. Row of $e_1$ in the connection matrix B is canceled.

Step 3: 1 is added to labels of all edges $e_j$ which are elements $b_{ij}=1$ of B, for already checked vortexes $v_i$.

Step 4: all edges with label of 2 are canceled. If there is no edge with label of 1, go to Step 5. Otherwise, an optional edge $e_j$ with label of 1 within the already checked raw is selected and unchecked vortex which is connected with the selected edge is checked. Then, $e_j$ is included in T and the raw including $e_j$ is canceled from the matrix.

Step 5 when (I-1) edges are entered in T, this T provides the generation tree. If all the labels are 0, there exists no generation tree. Otherwise, go to Step 3.

(4-2) The basic matrix of closed loop (C) is obtained from the connection matrix (B) by utilizing the generation tree (T) as follows.

Step 1: p is defined as index representing the number of rows of closed loop basic matrix. Initially, p=1. A set of chords of the generation tree is determined as F=E-T.

Step 2: p-th chord in F is selected to determine it as an edge $e_k$. Rows in B corresponding to all chords other than $e_k$ are canceled.

Step 3: for i=1, . . . , (the number of vortexes)

Step 4: for j=1, . . . , (the number of edges)

Step 5 column i and row j are canceled when elements $b_{ij}$ and $b_{im}$ (m≠j) of B are $b_{ij}$=1 and $b_{im}$=0. Go to Step 4.

Step 6: Go to Step 3.

Step 7: $c_{pq}$=1 for all rows q which were not canceled.

Step 8: p=p+1. x is determined to a value of the number of edges minus the number of vortexes. If p is equal to x+2, the process is ended. C at that time is the closed loop basic matrix to be obtained. If p is smaller than x+2, all the canceled rows and columns of B are recovered. Then, go to Step 2.

(4-3) The basic matrix of cut set (K) is obtained from the connection matrix (B) by utilizing the closed loop basic matrix (C) as follows.

Step 1: column which forms a unit matrix is discovered in the closed loop basic matrix (C). By canceling this column, $C_0$ is obtained.

Step 2: a matrix of $$\begin{bmatrix} C_0 \\ I \end{bmatrix}$$

is generated by adding the unit matrix to $C_0$ as a row. The cut set matrix is obtained as the transposed matrix of this matrix.

(5) Then, partial graphs are extracted by using the basic matrix of the cut set. The cut set represents how to cancel edges for dividing the graph. Thus, by utilizing the cut set, the partial graph including vortexes of the number equal to or less than a determined value is obtained as follows.

Step 1: basic cut set contained in the cut set basic matrix (K) is canceled if the number of its vortexes which are contact with the edge set is more than MP.

Step 2: For each basic cut set, the maximum values of support and confidence between the contacting vortexes are confirmed.

Step 3: For each basic cut set, priority is determined in decreasing order of the number of vortexes, the maximum support and the maximum confidence.

Step 4: from the edge set E, edges contained in the basic cut set are canceled in decreasing order of the priority. However, if any one of the edge to be canceled has been already canceled, this basic cut set is rejected.

Step 5: the vortexes contacting with the basic cut set which can be canceled is confirmed, and then the partial graph constituted only by these vortexes is accommodated into "a set of final partial graphs R".

Step 6: When E={ϕ} or K={ϕ}, the process is ended. In the latter case, the remainder of the set E is stored into R. However, when the number of the remaining edge is equal to 1, the reminder is rejected without storing into R.

(6) Finally, groups of parameters are outputted. For each graph contained in the set of final partial graphs R, groups of contacting vortexes are provided. These provided vortexes are groups of parameters to be obtained.

The operation of the analysis unit 13 shown in FIG. 1 is now described in detail.

This analysis unit 13 executes the VAR analysis with respect to the focused groups of parameters. In the analysis unit 13, the VAR model is used as the prediction model. By using the VAR model, an appropriate model can be effectively obtained from observed data of the parameters. Also, in the unit 13, the method of least squares is utilized for estimating the VAR model. As a result, an approximate value of the maximum likelihood estimator with respect to the auto regressive model can be obtained.

The characteristic variants of the observed data are defined as Δt: measuring time width (sec), N: the number of observation points, and T: total observation time (=N×Δt sec).

In the VAR model, the multivariate time sequence is defined as $y_n=[y_n(1),y_n(2), \ldots , y_n(L)]^t$, where t is a transposition matrix, $y_n(i)$ is the value of the parameter #i at time n, and L is the number of the focused variates. Thus, the VAR model which represents the current value of the multivariate time sequence by means of the past values $(y_{n-1}, \ldots , y_{n-m})$ and white noise is defined as follows.

$$y_n = \sum_{i=1}^{m} A_i^m y_{n-i} + v_n$$

where $A_i^m=\{a_i(p,q)\}$ is an AR coefficient matrix (L×L matrix: p=1, . . . , L, q=1, . . . , L), $v_n$ is a L-th dimension white noise, and m is an AR degree which designates what number of the past values should be used.

In the AR method, generally the model is not applied to all of the observed data, and thus a window width is determined. Namely, the whole is divided into several segments and estimator in each of the segments is averaged so as to lower estimation error. The maximum frequency which can be measured is given as $f_{max}$=½Δt (Hz) based upon the Nyquist theorem, and the minimum frequency which can be measured is given as $f_{min}$=1/T=1/NΔt (Hz). Thus, the estimation error is in inverse proportion to a square root of the number of the segments. Namely, the greater number of the segments, th lower estimation error. Also, the minimum frequency which can be measured is decreased resulting the observation frequency range to narrow.

A prediction model is constituted by using the VAR model as follows.

Following processes are independently executed for each group $V_j$ of the parameters. Therefore, although the description relates to the evaluation of only one group, all the groups ($V_j$: j=1, . . . , M) are similarly evaluated.

(a) In order to constitute estimation model of each parameter, the AR model is estimated in accordance with the observed data. The least square method is adopted for the estimation algorithm. Thus, it is possible to use different AR degrees for the respective variates resulting that more flexible modeling than the generally utilized Yule-Walker method can be provided. The optimum AR degree m* is determined by the Akaike's information criteria (AIC).

In the estimation of the VAR model using the least square method, a modified VAR model is used as follows.

$$y_n = B_0^m y_n + \sum_{i=1}^{m} B_i^m y_{n-1} + w_n$$

where the matrix $B_0^m$ is a lower triangular matrix in which all elements on the diagonal and in its lower area are "0" as $$S = \begin{bmatrix} s_{1,1} & \cdots & s_{1,Lm+L} \\ & \ddots & \vdots \\ & & s_{Lm+L,Lm+L} \\ O & & \end{bmatrix}$$

follows.

$$B_0^m = \begin{bmatrix} 0 & 0 & \cdots & 0 \\ b_0(2,1) & 0 & \cdots & 0 \\ \vdots & \vdots & \ddots & \vdots \\ b_0(L,1) & \cdots & b_0(L,L-1) & 0 \end{bmatrix}$$

Each of the coefficient matrixes $B_i^m$ is expressed as;

$$B_i^m = \begin{bmatrix} b_i(1,1) & \cdots & b_i(1,L) \\ \vdots & & \vdots \\ b_i(L,1) & \cdots & b_i(L,L) \end{bmatrix}$$

The VAR model can be extracted from $A_i^m = (I - B_0^m)^{-1} B_i^m$.

Herein after, algorithm of the VAR model estimation is described in detail.

(1) The maximum degree of the AR degree to be evaluated is determined (m).

(2) The following (N-m)×(Lm+L) matrix X is defined depending upon the observed data.

$$X = \begin{bmatrix} y'_m & \cdots & y'_1 & y'_{m+1} \\ y'_{m+1} & \cdots & y'_2 & y'_{m+2} \\ \vdots & \ddots & \vdots & \vdots \\ y'_{N-1} & \cdots & y'_{N-m} & y'_N \end{bmatrix}$$

(3) The following processes are executed to j=1, . . . , L.

(3-1) The matrix X is transformed by means of the Householder transformation which transforms using the orthogonal transformation an optional matrix into an upper triangular matrix to obtain the following form.

If j=1 else $$S = \begin{bmatrix} s_{1,1} & \cdots & s_{1,Lm} & s_{1,Lm+1} & \cdots & s_{1,Lm+j-1} & s_{1,Lm+j} & \cdots & s_{1,Lm+L} \\ \vdots & & \vdots & & \ddots & \vdots & & & \\ s_{j-1,1} & \cdots & s_{j-1,Lm} & & & s_{j-1,Lm+j-1} & \vdots & & \vdots \\ s_{j,1} & \cdots & s_{j,Lm} & & & & \vdots & & \vdots \\ & \ddots & \vdots & & & & & & \\ & & s_{Lm+j-1,Lm} & & & & s_{Lm+j-1,Lm+j} & \cdots & s_{Lm+j-1,Lm+L} \\ & & & & & & s_{Lm+j,Lm+j} & \cdots & s_{Lm+j,Lm+L} \\ & & & & & & & \ddots & \vdots \\ & & & & & & & & s_{Lm+L,Lm+L} \\ O & & & & & & & & \end{bmatrix}$$

(3-2) For p=1, . . . , m, a residual variance and AIC of the p degree model are calculated as follows:

residual variance of the p degree model:

$$\sigma_p^2(j) = \frac{1}{N-m} \sum_{i=Lp+1}^{Lm+1} s_{i,Lm+1}^2$$

AIC of the p degree model:

$$\text{AIC}_p(j) = (N-m)(\log 2\pi \sigma_p^2(j) + 1) + 2(Lp+1).$$

(3-3) The degree p in which the minimum AIC can be obtained is determined to an optimum degree for j-th variate (m*(j)=p).

(3-4) The AR coefficients can be obtained as a solution of the following linear equation. According to the equation, the solution can be easily obtained by backwardly substituting.

If j=1

$$\begin{bmatrix} s_{1,1} & \cdots & s_{1,Lm^*} \\ & \ddots & \vdots \\ O & & s_{Lm^*,Lm^*} \end{bmatrix} \begin{bmatrix} c_1 \\ \vdots \\ c_{Lm^*} \end{bmatrix} = \begin{bmatrix} s_{1,Lm+1} \\ \vdots \\ s_{Lm^*,Lm+1} \end{bmatrix}$$

where Lm* degree vector:

$$C_1=(b_1(1,L), \ldots, b_{m^*}(1,1), \ldots, b_{m^*}(1,L)).$$

else $$\begin{bmatrix} s_{1,1} & \cdots & s_{1,Lm^*} & s_{1,Lm+1} & \cdots & s_{1,Lm+j-1} \\ \vdots & & \vdots & & \ddots & \vdots \\ s_{j-1,1} & \cdots & s_{j-1,Lm^*} & & & s_{j-1,Lm+j-1} \\ s_{j,1} & \cdots & s_{j,Lm^*} & & & \\ & \ddots & \vdots & & & \\ & & s_{Lm^*+j-1,Lm^*} & & & \end{bmatrix} \begin{bmatrix} c_1 \\ \vdots \\ c_{j-1} \\ c_j \\ \vdots \\ c_{Lm^*+j-1} \end{bmatrix} = \begin{bmatrix} s_{1,Lm+j} \\ \vdots \\ s_{j-1,Lm+j} \\ s_{j,Lm+j} \\ \vdots \\ s_{Lm^*+j-1,Lm+j} \end{bmatrix}$$

where (Lm*+j−1) degree vector:

$$C_j=(b_1(j\ 1), \ldots, b_1(j,L), \ldots, b_{m^*}(j,1), \ldots, b_{m^*}(j,L), b_0(j,1), \ldots, b$$

(3-5) The AR coefficients expressed by C are stored in the corresponding matrixes $B_0, B_1, \ldots, B_{m^*}$, respectively.

(4) The AR coefficients in the general VAR model are calculated.

$$A_i = (I - B_0)^{-1} B_i$$

where i=1, ..., M, M is the maximum value of the AR coefficients of all the variates.

(a') It is desired that the calculated AR coefficients are reset depending upon the association rules between the parameters provided from the generation unit 11. In fact, the AR coefficient between the parameters with no association rule is forcefully reset to "0". As a result, possible error or apparent association which may be often occurred in the multivariate analysis can be prevented from generation.

The processes of this operation is as follows.

(1) With respect to the focused parameters, combinations each consisting of a pair of the parameters are determined.

(2) For the pair (y(i),y(j)), it is judged whether "association rule of that y(i) is contained in the body and y(j) is contained in the head" exists. If the rule exists, go to (4).

(3) If the association rule does not exist, the AR coefficient which contributes relationship from y(i) to y(j) is reset to "0". In other words, "element on column corresponding to y(i) and on raw corresponding to y(j)" is reset to "0".

(4) For the same pair (y(i),y(j)), it is judged whether "association rule of that y(j) is contained in the body and y(i) is contained in the head" exists. If the rule exists, go to (6).

(5) If the association rule does not exist, the AR coefficient which contributes relationship from y(j) to y(i) is reset to "0". In other words, "element on column corresponding to y(j) and on raw corresponding to y(i)" is reset to "0".

(6) Jump to (2) to consider another pairs. (b) Then, one point forward prediction of each variate is executed by using the VAR model. Namely, the value of the focused variate at current time n is predicted in accordance with the past observed values at times n-1, n-2, ..., n-m.

The processes of this prediction operation is as follows.

(1) One point forward prediction model is defined by canceling noise source in th VAR model.

The one point forward prediction model is expressed as;

$$y_n = \sum_{i=1}^{M} A_i y_{n-i}$$

where $A_i$ is an AR coefficient matrix (L×L matrix: i=1, ..., M), and M is the maximum value of AR degrees for all variates.

(2) The one point forward prediction of the respective variates is executed by applying the model to the observed data.

The operation of the filtering unit 14 shown in FIG. 1 is now described in detail. This unit 14 extracts the association rules for filtering. More concretely, this unit verifies reliability of the association rules between the events which are obtained in the unit 11 by means of the Signal Transmission Path (STP) analysis method. By adopting the STP analysis method, if the relationship between the parameters has linearity, the appeared relationship between the parameters can be quantitatively analyzed.

The flow of processes in the filtering unit 14 is (a) estimation of a VAR model, (b) calculation of noise contribution ratio (NPC) based upon the VAR model, (c) calculation of partial noise contribution ratio (PNPC) based upon the VAR model, (d) calculation of partial coherence (PCH) based upon the VAR model, (e) determination of focussing frequency, and (f) evaluation of the association rules by comparing NPC with PNPC-PCH.

The definition of the characteristic variants of the observed data, the multivariate time sequence and the VAR model are the same as those in the VAR analysis.

The sample cross covariance matrix is defined as follows where $[y_1(i) y_2(i), \ldots, y_N(i)]$, i=1, ..., L is observed.

$$C_k = \{c_k(i, j)\}$$

$$c_k(i, j) = \frac{1}{N} \sum_{n=k+1}^{N} (y_n(i) - \hat{\mu}(i))(y_{n-k}(j) - \hat{\mu}(j))$$

$$\hat{\mu}(i) = \sum_{n=1}^{N} y_n(i) \frac{1}{N}$$

In filtering process of the association rule by means of the STP analysis method, a window width and threshold values for evaluation based upon NPC, PNPC and PCH are determined. The window width is determined as the same as that in the aforementioned VAR analysis.

The threshold values for evaluation based upon NPC, PNPC and PCH are determined by selecting one of the following two definitions.

absolute definition of the threshold value: although relationships between the parameters are evaluated by the STP analysis, the threshold value used is not clear. Thus, in the comparison of the estimators, it is necessary to have an acceptable range of the threshold value. In general, the threshold will be determined to about 10 % of the estimator, but it is desired to determine it by cut-and-try methods.

relative definition of the threshold value: with respect to relationships between the parameters, a predetermined number of threshold values with greater estimators are adopted.

Filtering of the association rules is executed as follows.

Following processes are independently executed for each group $V_j$ of the parameters. Therefore, although the description relates to the evaluation of only one group, all the groups ($V_j$: j=1, ..., M) are similarly evaluated.

(a) In order to execute the STP analysis, the AR model is estimated in accordance with the observed data. AR coefficients to be obtained are used as information sources for the STP analysis. The Yule-Walker method is adopted to the estimation algorithm. The optimum AR degree m* is determined by the Akaike's information criteria (AIC).

Herein after, algorithm of the VAR model estimation is described in detail.

(1) The maximum degree of the AR degree to be evaluated is determined (m).

(2) The sample cross covariance matrix for k=0,1, ..., m is calculated ($C_0, C_1, ..., C_m$).

(3) $V_0 = U_0 = C_0$
$AIC_0 = N(L \log 2\pi + \log|V_0| + L) + L(L+1)$ (4) For p=1, ..., m, $$(4.1) \quad W_p = C_p - \sum_{i=1}^{p-1} A_i^{p-1} C_{p-i}$$

$$(4.4) \quad V_p = C_0 - \sum_{i=1}^{P} A_i^P C_i^t$$

$$U_p = C_0 - \sum_{i=1}^{P} B_i^P C_i$$

(4.5) $AIC_p = N(L \log 2\pi + \log|V_p| + L) + L(L+1) + 2L^2 p$
where $A_i^0$ is a L dimensional unit matrix, and $D^{-1}$ is an inverse matrix of the matrix D.

(5) m*=p: $AIC_p$ is minimum. At this time, the AR coefficients to be obtained are expressed as $A_i^{m*}$ (i=1, ..., m*).

(a') It is desired that the calculated AR coefficients are reset depending upon the association rules between the parameters provided from the generation unit 11. In fact, the AR coefficient between the parameters with no association rule is forcefully reset to "0". As a result, possible error or apparent association which may be often occurred in the multivariate analysis can be prevented from generation.

The processes of this operation is as follows.

(1) With respect to the focused parameters, combinations each consisting of a pair of the parameters are determined.

(2) For the pair (y(i),y(j)), it is judged whether "association rule of that y(i) is contained in the body and y(j) is contained in the head" exists. If the rule exists, go to (4).

(3) If the association rule does not exist, the AR coefficient which contributes relationship from y(i) to y(j) is reset to "0". In other words, "element on column corresponding to y(i) and on raw corresponding to y(j)" is reset to "0".

(4) For the same pair (y(i),y(j)), it is judged whether "association rule of that y(j) is contained in the body and y(i) is contained in the head" exists. If the rule exists, go to (6).

(5) If the association rule does not exist, the AR coefficient which contributes relationship from y(j) to y(i) is reset to "0". In other words, "element on column corresponding to y(j) and on raw corresponding to y(i)" is reset to "0".

(6) Jump to (2) to consider another pairs.

(b) The noise contribution ratio (NPC) is an estimator indicating contribution of a certain noise source causing fluctuation in the focused variate. The NPC with a value closer to 1 indicates that it is the main source of the fluctuation. The NPC is calculated as follows.

(1) A Power Spectral Density (PSD) function is calculated by $P(f) = 2\Delta t \{A(f)\}^{-1} W \{A(f)^*\}^{-1}$, where D* is a complex conjugate of the complex matrix D, A(f) is the AR coefficient expressed in a function of frequency $$A(f) = I - \sum_{i=1}^{m} A_i \exp(-j \cdot 2\pi \cdot f \cdot i \cdot \Delta t)$$

(I: L×L unit matrix, Δt: observation time width), and W is a covariance matrix of noise.

$$W = \{\sigma_{ij}\} = C_0 - \sum_{i=1}^{m} A_i C_i$$

P(f) is a L×L matrix. An (i,i) element $P_{i,i}(f)$ is called as Auto Power Spectral Density (APSD) of the variate y(i), and (i,j) element $p_{ij}(f)$ is called as Cross Power Spectral Density (CPSD) of the variates y(i) and y(j).

(2) The NPC is calculated as a noise contribution rate from a noise source of the variate y(j) to the variate y(i) as follows.

$$NPC_{ij}(f) = \frac{|B_{ij}(f)|^2 \sigma_{jj}}{\sum_{k=1}^{L} |B_{ik}(f)|^2 \sigma_{kk}}$$

$$B_{ij}(f) = (A(f)^{-1})_{ij}$$

where |D| is a determinant of the matrix D.

(c) The NPC evaluates the influences of the noise sources transmitted through all paths. Thus, the calculated NPC may be sometimes high when there exists no direct path but there exists an indirect path (apparent direct path) over the variate with that noise source. In order to avoid the problems, the partial noise contribution ratio (PNPC) which considers only the direct path between two variates is used. The PNPC is calculated as a partial noise contribution rate from a noise source of the variate y(J) to the variate y(i) as follows.

$$PNPC_{ij}(f) = \frac{|A_{ij}(f)|^2 \sigma_{jj}}{|A_{jj}(f)|^2 \sigma_{ii} + |A_{ij}(f)|^2 \sigma_{jj}}$$

(d) As similar to the conventional NPC, the general coherence (PCH) which represents degree of association of frequency components in the fluctuation between two variates is also influenced from the indirect paths. Thus, the partial coherence (PCH) which considers only the direct path between two variates is used. The PCH is calculated as a partial coherence from a noise source of the variate y(j) to the variate y(i) as follows.

$$PCH_{ij}^2(f) = \frac{|A_{jj}(f)(A_{ji}(f))^* - A_{ij}(f)(A_{ii}(f))^*|^2}{\{|A_{jj}(f)|^2 \sigma_{ii} + |A_{ij}(f)|^2 \sigma_{jj}\}\{|A_{ji}(f)|^2 \sigma_{ii} + |A_{ii}(f)|^2 \sigma_{jj}\}}$$

(e) Since the causality estimators are defined over the entire measuring frequency range, the evaluation is very difficult. Thus, estimation is executed in only focussed important frequency range between the two variates as follows.
(1) The frequency range is selected from one of all frequency range and a particular frequency band.
(2) The important frequency is estimated and selected from one of:
a frequency at which the maximum APSD of the variate for evaluating the noise contribution from another variate is obtained, or several relative maximum values, and
a frequency at which the maximum coherence between the two variates for evaluating the noise contribution is obtained, or several relative maximum values.

The coherence between the variate y(i) and the variate y(j) with respect to (i,j) element $p_{ij}(f)$ of the PSD function P(f) is defined as:

$$COH_{ij}(f) = |p_{ij}(f)|^2/(p_{ij}(f)p_{jj}(f)).$$

(f) Screening of the association rules is executed based upon the three causality estimators NPC, PNPC and PCH. First, in accordance with the NPC, it is confirmed whether there are direct or indirect paths. Then, it is confirmed whether there is a direct path between the two parameters in accordance with PNPC-PCH comparison. The evaluation of the association rules is executed for all combinations of two variates y(i) and y(j) of the focused variates or parameters as follows.
(1) If the NPC value at the frequency selected at (e) is within a tolerance error range and $NPC_{ij}(f)=0$, it is judged that there is no association rule between these two variates.
(2) If the PNPC and PCH values at the frequency selected at (e) are within respective tolerance error ranges and:
(2-1) $PCH_{ij}=PNPC_{ij}=PNPC_{ji}=0$, it is judged that there is no association rule between these two variates,
(2-2) $PCH_{ij}=PNPC_{ij}$ and $PNPC_{ji}=0$, it is judged that there is an association rule of the variate y(i)→variate y(j), and
(2-3) $PCH_{ij}=PNPC_{ji}$ and $PNPC_{ij}=0$, it is judged that there is an association rule of the variate y(j)→variate y(j).
(3) If PNPC values at all frequency satisfy, within a tolerance error range, the next two conditions, there is a bidirectional association rule (feedback) between the two variates:

$0<PNPC_{ij}(f)<1$ and $0<PNPC_{ji}(f)<1$, and
patterns of PNPC differ from patterns of PCH in all frequency ranges (these can evaluated from the distances between both patterns and inner product values).

(4) The association rule with no contradiction with respect to (1)–(3) is adopted. When combinations of all parameters are evaluated, the process is completed with providing the finally adopted association rule.

The display unit 15 shown in FIG. 1 displays thus extracted association rule between the parameters in graphs which will provide clear understanding. This unit 15 utilizes basically the STT method which is one of automatic plotting and graphing methods. The algorithm of the STT method consists of layering, normalization, determination of arranging order of vortexes, determination of arranging coordinates of vortexes and shaping of graph. Since this display unit 15 can be constituted any another configuration, detailed explanation of the operation in this unit 15 is omitted in the specification.

Many widely different embodiments of the present invention may be constructed without departing from the spirit and scope of the present invention. It should be understood that the present invention is not limited to the specific embodiments described in the specification, except as defined in the appended claims.

What is claimed is:

1. A system for filtering events which have occurred within a predetermined period of time, comprising:
a first generation means for generating association rules between the events which simultaneously occur within the predetermined period of time using a data extraction methodology;
a second generation means for generating groups of events suited for VAR model analysis based upon the association rules generated in said first generation means;
an analysis means for analyzing the groups of events generated in said second generation means, said analysis of the event groups being executed to make a prediction model by using the VAR model analysis; and
a verifying means for verifying reliability of the association rules generated in said first generation means, said verification being executed by using the VAR model.

2. The system as claimed in claim 1, wherein said first generation means includes means for generating association rules between the events based upon a basket analysis method using support considering Poisson error and confidence considering error.

3. The system as claimed in claim 1, wherein said second generation means includes means for dividing the events into groups of events, each of the groups having the number of events equal to or less than a predetermined number.

4. The system as claimed in claim 1, wherein said analysis means includes means for forcibly resetting coefficients used in the VAR model when there is no association rule between the events corresponding to the coefficient.

5. The system as claimed in claim 1, wherein said verifying means includes means for verifying reliability of the association rules by using the STP analysis method.

6. The system as claimed in claim 1, wherein said verifying means includes means for forcibly resetting coefficients used in the VAR model when there is no association rule between the events corresponding to the coefficient.

* * * * *